United States Patent Office 3,500,176
Patented Mar. 10, 1970

3,500,176
METHOD AND APPARATUS FOR CONTROLLING A MAGNETIC FIELD EMPLOYING OPTICALLY PUMPED NUCLEAR RESONANCE
Alfred Kastler and Jean-Claude Lehmann, Paris, France, assignors to Etablissement Public Centre National de la Recherche Scientifique, Paris, France, a corporation of France
Filed Aug. 16, 1966, Ser. No. 572,848
Claims priority, application France, Aug. 16, 1965, 28,453
Int. Cl. G01n 27/00
U.S. Cl. 324—.5          6 Claims

ABSTRACT OF THE DISCLOSURE

Methods and apparatus are disclosed for measuring the ambient magnetic field in a region of space. An optical resonance gas cell in the space is irradiated by optical pumping and detection beams. Three sets of magnetic field producing coils are arranged adjacent the cell on mutually perpendicular axes. The absorption of the pumping and detection beams is utilized to control the current in the coils. Measurement of the current produces an indication of the strength of the ambient magnetic field.

This invention relates to a method for controlling a magnetic field at zero value and/or for measuring the field thus compensated in intensity, orientation and direction, and to an apparatus for carrying this method into effect.

Devices are known which are adapted to reduce the magnetic field prevailing in a given space to as low a value as possible. Such devices operate either through magnetic screening, or by compensation, their performance being limited to a value of the order of a few tenths of a micro-gauss.

Various types of magnetometers are also known for the measurement of a field intensity. The most efficient of such instruments resort either to the use of the magnetic resonance of an alkaline metal vapour or of helium oriented by optical pumping or to the measurement of the Larmor precession speed, in water of protons oriented by means of the Overhauser effect or of a temporary, high intensity field. The highest performances of such apparatus are of the order of one micro-gauss for measurements in absolute value and of the order of 0.2 micro-gauss for fluctuation measurements.

Such apparatus generally measure only the absolute value of the field or of the variations thereof and fail, moreover, to operate under certain unfavourable orientations.

Apparatus are known which are effective to measure through induction methods the variations as a function of time, of the different components of a magnetic field. Said apparatus are highly sensitive to the fluctuations of the field observed, since they may reach values as low as one hundredth of a micro-gauss.

It is an object of this invention to provide a method and an apparatus adapted to perform by themselves these various functions generally accomplished by different apparatus, i.e., on one hand, the establishment by servo means of a space region wherein the prevailing static magnetic field has an intensity very close to zero, and/or, on the other hand, the independent measurement, along three fixed or mobile axes, of the components of the external magnetic field thus compensated for.

It is another object of the invention to provide a method and apparatus for performing these multiple funtions to attain an obsolute precision of the order of one micro-gauss for an external field having a value of the order of the terrestrial magnetic field (0.5 gauss) and a sensitivity to the fluctuations of said field of the order of one tenth of a micro-gauss.

For this purpose, the method of the invention consists essentially in the production of controlled, measurable currents circulating in a system of bucking coils, and in using the Hanle effect in the fundamental state of convenient particles, for instance atoms, possessed in this state of nuclear or electronic paramagnetism and oriented by means of optical pumping.

The Hanle effect is described in the following books: W. Hanle—Z.f. Physik 30, 93 (1924), A. C. G. Mitchell and W. Zemansky—"Resonance Radiation and Excited Atoms," page 264 (Cambridge University Press, Cambridge, England 1934). The following definition of the Hanle effect is given. When atoms or molecules in a fundamental or excited state are placed in a magnetic field which is progressively reduced to zero, the Zeeman sub-levels of these atoms or molecules draw closer together and intermingle, save for their natural width, below a certain value of the applied magnetic field. When that occurs, given certain conditions of optical excitation of the atoms or molecules in question, it is possible to set up an electronic or nuclear "orientation" perpendicular to the applied magnetic field. This orientation can only subsist for very low values of the magnetic field, its disappearance provides an indication of the intensity of the field, indicating that it has gone beyond the value for which the Zeeman sub-levels become distinct, save for their natural width.

The apparatus according to the invention, for carrying this method into effect comprises essentially (a) an optical resonance cell unit embodying the center of a trirectangle trihedron at a first, a second and a third axis, (b) means for producing a beam of optical pumping on at least said first axis, (c) means for producing an optical detection beam, first on at least said second axis, then on at least two of said three axes, (d) a photoelectric detector of an optical detection signal occurring on the corresponding axis and from which there is established a D.C. pilot voltage of the following element, (e) a circuit adapted to supply a D.C. control current for the following element, (f) a pair of bucking coils in the Helmholtz position.

Other objects, features and advantages of the invention will be apparent from the following description of three embodiments of the apparatus according to the invention, given by way of non limitative examples, with reference to the appended drawings, in which.

Figure 1:
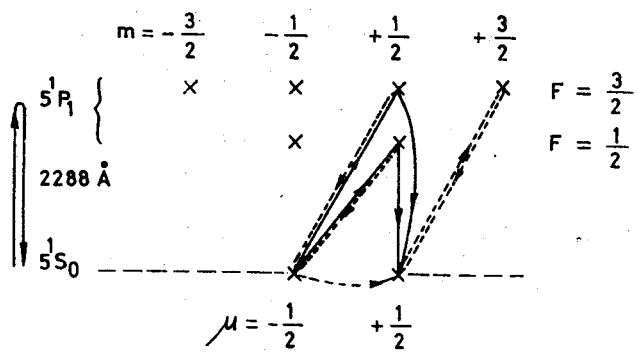
FIG. 1 is a graph of sub-levels of cadmium 111 and of the process of optical pumping utilized.

Referring now to the drawings, the principle underlying the process of the invention will be explained with the aid of a comparatively simple example considering cadmium 111 ($^{111}$Cd) the O-shell of which comprises two valence electrons.

According to the Russel-Saunders coupling, wherein the spin-orbit interaction is considered as a weak disturbance, first of all the orbital moments 1 of the electrons are coupled to obtain a resultant moment L, and separately the electronic spins $s$ to obtain a resultant spin S, and only then the spin-orbit coupling is introduced, by composing $J=L+S$.

In the case of $^{111}$Cd, the electronic spins $s_1=\frac{1}{2}$ and $s_2=\frac{1}{2}$ compose to give either $S=0$ or $S=1$.

In the ground state, the orbital moments $l_1=0$ and $l_2=0$ compose to give $L=0$. For the LS-coupling, only the value $S=0$ is acceptable, which gives $J=0$, and the corresponding energy level is designated as $5^1S_0$.

The conventional symbolism of this mode of notation of the energy levels is as follows. The first figure on the left, 5 indicates that the electrons considered are on the O-shell ($n=5$), the letter S means that $L=0$, the upper left index is equal to $2S+1$ and the lower right index gives the effective value of J.

In the excited state, the orbital moments are, for instance, $l_1=0$ and $l_2=1$, which, after composition give either $L=0$ or $L=1$. Upon coupling $S=0$ and $L=1$, only $J=1$ is obtained, corresponding to the energy level $5^1P_1$. By coupling $S=1$ and $L=1$, $J=0$, 1 or 2 is obtained, corresponding to the three energy levels $5^3P_0$, $5^3P_1$ and $5^3P_2$, respectively.

Between the ground state and the excited state, the selection rules are such that there exists only two lines: 2,228 A:$5^1S-5^1P_1$, and 3,261 A:$5^1S_0-5^3P_1$.

It is possible to choose to cause, as desired, one or the other of said two lines to be absorbed in a cadmium vapour, by conveniently selecting the vapour pressure thereof.

Now, taking into account the fact that $^{111}$Cd has a nuclear spin $I=\frac{1}{2}$, the coupling $F=J+I$ leads to a hyperfine structure with separation of the preceding levels, as follows.

In the ground state, coupling IJ where $J=0$ leads to $F=\frac{1}{2}$ (a sub-level designated as $5^1S_0$, $F=\frac{1}{2}$), i.e. the magnetic moment of the atom is then exclusively due to its nuclear spin and its projection on a quantization axis may assume but the two values $\mu=-\frac{1}{2}$ or $+\frac{1}{2}$.

In the excited state, or more precisely for instance, at level $5^1P_1$ (the same being true, in fact, for level $5^3P_1$), the coupling IJ where $J=1$ results in assuming for F the two values $\frac{1}{2}$ and $\frac{3}{2}$, and therefore the projection of the magnetic moment on an axis of quantization may assume the various values $m=-\frac{3}{2}, -\frac{1}{2}, +\frac{1}{2}, +\frac{3}{2}$.

The above mentioned various values for $\mu$ and $m$ have been plotted in FIGURE, where the two energy levels—the ground level and the excited level—correspond to two spectral terms separated by a distance equal to 2288 A.

The optical pumping by line 2288 A., polarized for instance by $\sigma^+$, i.e. the electric field vector of which rotates in the direction of a corkscrew driving in the direction of the quantization axis, causes a transition $m-\mu=+1$, account being taken of the selection rules of the optical domain, requiring the conservation of the angular momentum.

The optical pumping cycle includes said transitions and those due to the fall-back of the atoms to ground level. These different transitions are indicated by solid and broken lines, epstively in FIGURE 1. If the process of absorption of a photon $\sigma^+$ by an atom and the fall-back thereof to ground state is reproduced at time intervals lower than the thermal relaxation time which resets the atom from sub-level $\mu=+\frac{1}{2}$ to sub-level $\mu=-\frac{1}{2}$, it may be seen from FIGURE 1 that the pumping results in an accumulation of the atoms at sub-level $\mu=+\frac{1}{2}$ through the transitions indicated in solid lines in, i.e. an orientation of the nuclear spins thereof.

Figure 2:
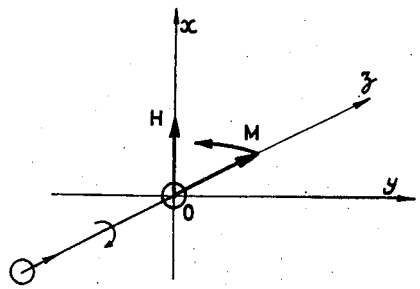
FIG. 2 is a perspective diagram illustrating the Larmor precession of magnetic field vector M.

The overall effect of the illumination process is thus to create within the vapour a macroscopic magnetic moment $\overline{M}$ parallel to the optical pumping axis, taken, for instance, as axis $Oz$ (see FIGURE 2). The value of M, which corresponds to the nuclear orientation rate as reached by the optical pumping process, depends essentially on the value of the ratio $T_p/T$, where T is the time of relaxation of the spins towards their thermal balance and $T_p$ the period of time separating, for a given atom, the absorption of two successive photons; it is clear that $1/T_p$ is proportional to the pumping light intensity. It is assumed that, under the effect of thermal relaxation, $\overline{M}$ relaxes towards zero, and this with the same time constant for the component of $\overline{M}$ which is parallel to the existing magnetic field, and for its component perpendicular to the said field, which is justified on account of the very small value of the field under consideration.

The nuclear orientation rate attained by the herein described method is very high: it is in fact higher than 90%.

It will now be assumed that there exists, at the level of the cadmium vapour cell, so called optical resonance cell, a magnetic field $\vec{H}$ along an axis perpendicular to the pumping axis, for instance along $Ox$ (see FIGURE 2). This leads to $\vec{M}$ precessing around $\vec{H}$ at the Larmor angular velocity, i.e. $\omega=\gamma H$, $\gamma$ being the gyromagnetic ratio of the nuclear spin considered. During the said precession, $\vec{M}$ is moreover biased by the thermal relaxation which causes it to tend towards zero with the time constant T, and by the optical pumping which tends to realign it along $Oz$ with the time constant $T_p$.

By setting $1/\tau=1/T+1/T_p$, the following different cases may be distinguished.

If $\omega \ll 1/\tau$, $\vec{M}$ has no time to rotate substantially before either relaxing towards zero, or being oriented along $Oz$. Its average direction remains thus that of $Oz$.

If $\omega \gg 1/\tau$, $\vec{M}$ rotates a great number of times about $Ox$ before being affected by the relaxation or by the optical pumping. Its mean value is therefore zero.

If $\omega \simeq 1/\tau$, $\vec{M}$ rotates by a fraction of a rotation around $Ox$ before being either destroyed by the relaxation, or re-oriented along $Oz$ by the optical pumping. Its average direction is then intermediate between that of $Oz$ and that of $\mp Oy$ (— or + according to that $\vec{H}$ is in the direction of $Ox$ or in the opposite direction).

The above mentioned qualitative results are confirmed by theoretical calculation. The law of evolution of M under the influence of the Larmor precession (terms in $\omega$) and the optical pumping (terms in $1/T_p$) is given by the following systems of equations:

$$\frac{dM_x}{dt} = -\left(\frac{2}{3T_p}+\frac{1}{T}\right)M_x$$

$$\frac{dM_y}{dt} = -\left(\frac{2}{3T_p}+\frac{1}{T}\right)M_y - \omega M_z$$

$$\frac{dM_z}{dt} = \omega M_y - \left(\frac{4}{9T_p}+\frac{1}{T}\right)M_z + \frac{4}{9T_p}M_z^{max},$$

wherein $M_x$, $M_y$ and $M_z$ are the values of the components of $\vec{M}$ along the corresponding axes $Ox$, $Oy$, $Oz$ and $M_z^{max}$ the maximum value of $M_z$, i.e. its value when all the nuclear spins of the vapour are oriented in the $Oz$-direction.

The stationary value of $\vec{M}$ is obtained by reducing to zero the above derivatives, which gives for the corresponding components of $\vec{M}$:

(1) $\qquad M_x^{st} = 0$ $$M_y^{st} = -M_z^{max} \cdot \times \frac{\frac{4}{9T_p}\omega}{\omega^2 + \left(\frac{4}{9T_p}+\frac{1}{T}\right)\left(\frac{2}{3T_p}+\frac{1}{T}\right)}.$$

$$M_z^{st} = M_z^{max} \cdot \frac{\frac{4}{9T_p}\left(\frac{2}{3T_p}+\frac{1}{T}\right)}{+\left(\frac{4}{9T_p}+\frac{1}{T}\right)\cdot\left(\frac{2}{3T_p}+\frac{1}{T}\right)}$$

Figure 3:
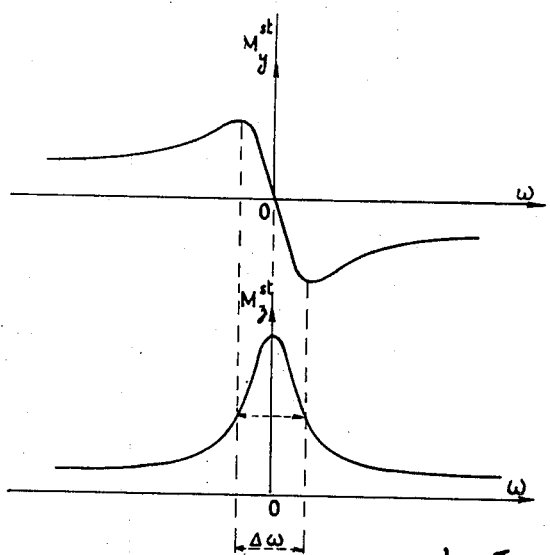
FIG. 3 is a graph representative of the Hanle-effect curves.

It may be seen that $M_z^{st}$, an even function of $\omega$, may be represented in the neighbourhood of $\omega=0$ by an absorption curve $M_y^{st}$, an odd function of $\omega$, may be represented under the same conditions by a dispersion curve (see FIGURE 3). It is a signal of the type $M_y^{st}$ which will be used in the invention to control $\omega$ at the zero value. The "width" of these so-called Hanle effect curves, i.e. the width at half-height of the absorption curve or, alternatively, the distance between the abscissae of the extremes of the dispersion curve is:

$$\Delta\omega = \sqrt{\left(\frac{4}{9T_p}+\frac{1}{T}\right)\left(\frac{2}{3T_p}+\frac{1}{T}\right)}$$

It is comparable to $1/\tau = 1/T + 1/T_p$ and the examination of expressions (1) enables the above-mentioned qualitative results to be found again.

For a deeper study of the theory thus outlined, the following publications may be referred to:

"Quelques suggestions concernant la production optique et al détection optique d'une inégalité de population des niveaux de quantification spatiale des atomes" ("Some suggestions relative to the optical production and optical detection of an inequality of population of spatial quantization levels of atoms") by Alfred Kastler, in "Le Journal de Physique et le Radium," Paris, vol. 11, June 1950, pp. 255 to 265.

"Resonance Radiation and Excited Atoms" by A. C. C. Mitchell and M. W. Zemansky, Cambridge University Press, London, 1934.

"Pompage optigue en champ magnétique faible" ("Optical Pumping in a Low Magnetic Feld") by Lehmann and Cohen-Tannoudji, in "Compte-Rendus à 1 'Académie des Sciences," Paris, vol. 258, May 4, 1964, pp. 4463 to 4466.

Optical detection signals proportional to $M_x$, $M_y$ and $M_z$, may be obtained by several methods.

One may observe the absorption of light intensity undergone by a so-called detection beam, circularly polarized and propagating along $Ox$ and $Oy$, said adsorption being proportional to $M_x$ or to $M_y$. It is however best to assign this beam but an intensity which is comparatively small relative to that of the optical pumping beam, in order not to risk disturbing the action of the latter.

One may also observe the absorption of light intensity by the pumping beam itself, which absorption is proportional to $M_z$.

One may however also observe the magnetic rotation of the polarization plane of a light detection beam, polarized linearily and propagating along $Ox$, $Oy$ or $Oz$. In order to be able to observe this effect, it is necessary that the radiation of the detection beam should not be absorbed by the resonance cell and should occur, consequently, in a spectral domain spaced by a few Doppler widths from the absorption line of the cell. This may be achieved by using either a lamp containing another isotope than that of the resonance cell, or a lamp identical to the pumping lamp in a magnetic field of an appropriate value. Moreover, the purity of the effect obtained may be improved by inserting between the detection lamp and the optical resonance cell a filter consisting of a transparent tank containing saturated vapour of the isotope placed in the resonance cell. However, when the said magnetic rotation is used for detecting the rotations of M, the energy level shifts due to the virtual transitions induced by the detection beam should preliminarily be studied. This method has however the advantage of presenting no hazard of disturbance of the optical pumping process.

One may finally observe the polarization of the fluorescence light. Terming $S_i^{\pm}$ the photoelectric singal supplied by a photomultiplier placed on the axis $Oi$ ($i$ being $x$, $y$ or $z$) and receiving fluorescent light having passed through circular analyzer having a $\pm$ direction of rotation around $Oi$ on one hand, and, on the other hand $S^o$, the signal delivered by a photomultiplier receiving fluorescent light having passed through a linear analyzer parallel to $Oz$, it can be shown that $S_x^+ - S_x^-$ is proportional to $M_x$, that $S_y^+/S_y^-$ is proportional to $My$ and that $S^o$ is proportional to $M_z^{max} - M_z$. This method is the most favourable in the case where cadmium vapour is used as the optical resonance vapour.

It will now be assumed that the prevailing magnetic field H has any given direction, the components thereof along the three axes then being $H_x$, $H_y$ and $H_z$. If said field has an intensity which is substantially smaller than $\Delta\omega/\gamma$ it can be shown that $M_x$ and $M_y$ are, at a first approximation, proportional to $H_y$ and $H_x$. It is on such results that the hereinafter described, first embodiment of the apparatus according to the invention is based, which is adapted to control H at the zero value and/or to carry out the vectorial measurement of the field, i.e. in intensity, orientation and direction.

When it is desired to carry out only the vectorial measurement of the prevailing field and to obviate the influence of the drifts which necessarily take place in the various parts of the apparatus (light intensity of the lamps, temperature of the resonance cell etc.) which should be either compensated or rendered negligible durign the utilization process of the apparatus, a modulation technique may be resorted to.

To this end, an oscillating magnetic field $H_1 \cos \Omega t$, is created, in the direction of $Ox$, for instance, such that $\gamma H_1$ and $\Omega$ are lower than or equal to $\Delta\omega$. It can be shown that, under such conditions, the following results are obtained:

In the absence of any static magnetic field, $M_x$ is zero and $M_z$ is modulated, its spectrum containing exclusively all the even harmonics of $\Omega$. In the presence of a magnetic field of low intensity relative to $\Delta\omega/\gamma$, the static components $M_x$ and $M_y$ remain proportional to $H_y$ and $H_x$, respectively, and the components modulated at the frequency of $M_x$ and of $M_z$ are proportional to $H_z$ and $H_x$, respectively. This proportionality means that the said modulated components counterbalance one another, their phase shifting by $\pi$, when the field passes at the zero value. After selective amplification at frequency $\Omega$ and detection responsive to phase, the signals obtained for $M_x$ and $M_z$ are thus proportional to $H_z$ and $H_x$, respectively.

Of course, if the oscillating magnetic field is created along $Oy$, the components of $M_z$ and $M_y$ modulated at the frequency $\Omega$ produce in the same manner signals which are proportional to $H_y$ and H, respectively, the static components of $M_x$ and $M_y$ remaining proportional to $H_y$ and $H_x$, respectively.

It is on the above results that the hereinafter described second and third embodiments of the apparatus of the invention are based.

It has been shown that the width $\Delta\omega$ of the Hanle-effect curves was in the most general case of the order of $$1/\tau = 1/T + 1/T_p$$

when measured in radians per second, i.e. $1/\gamma\tau$ when measured in gauss. The determining parameters are thus the thermal relaxation time T and the gyromagnetic ratio of the spins $\gamma$. It is effectively possible to select $T_p$ such amounts to saying that the light intensity of the pumping lamp can be chosen such that the orientation through optical pumping is satisfactory without the widening of the curves resulting from optical causes being too important.

In the most favourable case T is of the order of 1 second. Its value should not in fact be too high. Indeed, the response time of the control system is of the order of $\tau$, and therefore of T. If, on the other hand, a modulation techniqu is used, the frequency $\Omega$ of the modulation should be of the order of $1/\pi\tau$ and it is known that said frequency is the more convenient from the point of view of the signal-to-noise ratio that it is larger. In fact, it can hardly exceed 10 Hz.

It should however be noted that the modulation technique causes per se a widening of the curves which, here again, must be limited to the same order of magnitude as that resulting from other causes (of thermal and optical origin) if it is desired to optimize the "pointing" center of the Hanle-effect curves.

There remains to select the isotopic substance to be utilized so that $\gamma$ should have the greatest possible value. In this connection, it is advantageous to select an alkaline metal rather than cadimum 111 or 113 or mercury 199 for which $\gamma$ is about $6 \times 10^3$ sec.$^{-1}$ gauss.

In the case of $^{87}$Rb, the optical pumping concentrates the atoms in the sub-level $m=2$ of the hyperfine sub-level $F=2$ of level $^2S_{1/2}$ ($I=\frac{3}{2}$). For said sub-level $F=2$, $\gamma = g_F \mu_B = \frac{1}{2} \times 1.4 \times 10^6 \times 2\pi = 4.4 \times 10^6$ sec.$^{-1}$/gauss.

By means of known techniques, such as covering the walls of the resonance cell with paraffin or using a buffer gas, T may be made, as already mentioned, of the order of 1 second, $\tau$ of the order of 0.25 second, account being taken of the various above indicated widening causes, and the width of the Hanle curves of the order of $1/\gamma\tau \times 10^{-6}$ gauss.

It may be observed that the apparatus and the method according to the invention enable to effetcively reach a precision of one tenth of a microgauss, either by being capable of "pointing" one tenth of the "line width," or by improving the signal-to-noise ratio through enlarging the line and by being capable of "pointing" the hundredth or the thousandth of the line width.

Figure 4:
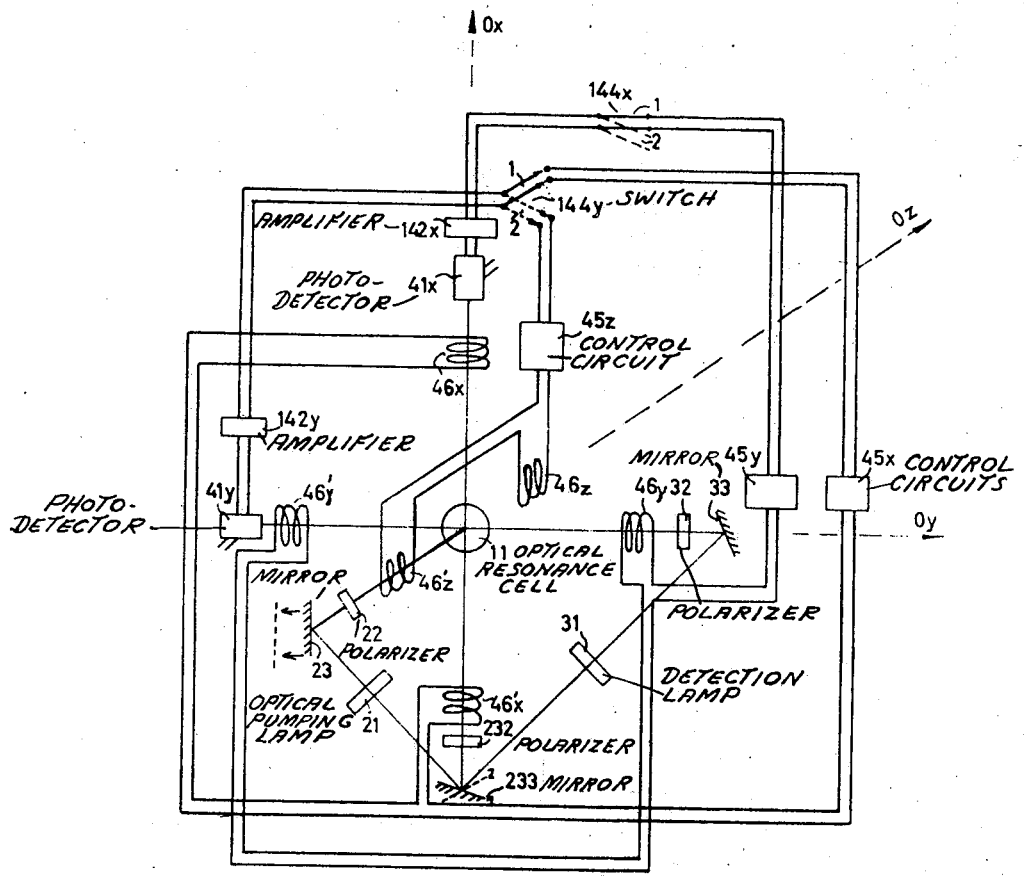
FIG. 4 is a perspective diagram of an arrangement of the apparatus according to a first embodiment of the invention.
Figure 5:
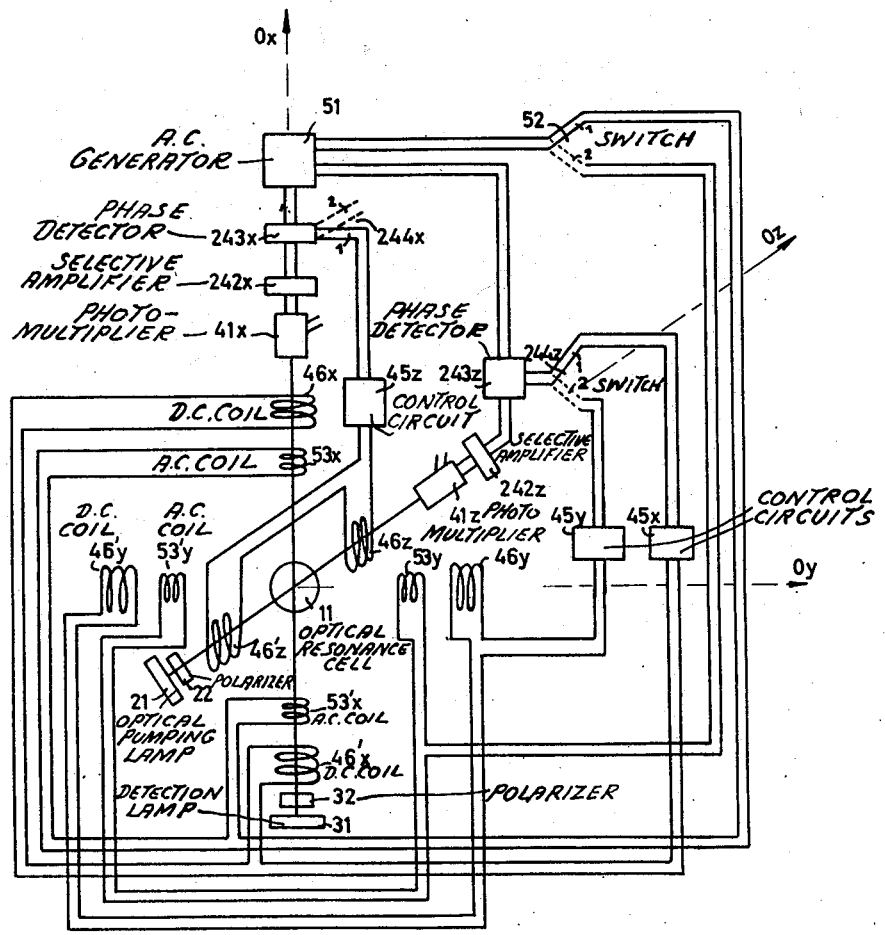
FIG. 5 is a similar diagram of a second embodiment of the apparatus of the invention.
Figure 6:
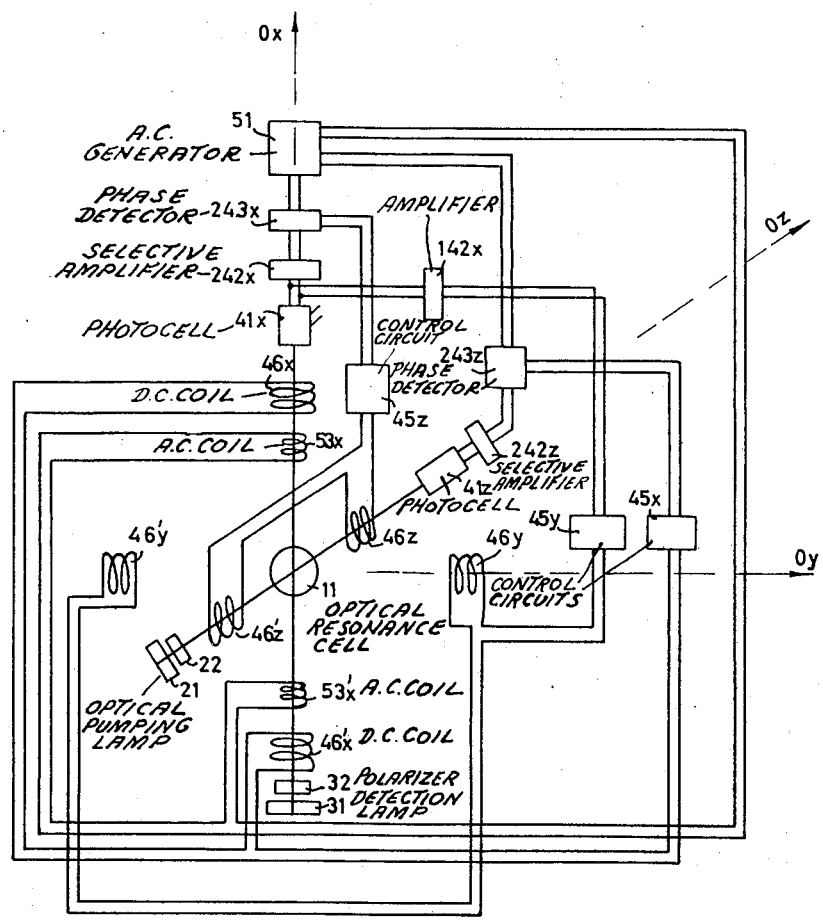
FIG. 6 is a similar diagram of a third embodiment of said apparatus.

Referring now to FIGURES 4, 5 and 6, three embodiments of the apparatus according to the invention are described hereinafter, by means of which the method as already defined and discussed hereinabove can be carried out, the parts common to said three embodiments, and which are indicated by the same reference numbers in the three figures.

An optical resonance cell 11—simply termed hereinafter "cell"—consists of a bulb of convenient material such as glass or quartz, containing vapour of the isotopic substance selected, for instance $^{87}$Rb. In order to improve the relaxation time of said vapour, the bulb either has its walls coated with paraffin, or it is filled with a so-called buffer-gas, according to well known techniques. Cell 11 is fitted with known means (not shown) enabling its temperature to be thermostatically controlled at a value delivering a convenient vapour pressure.

A lamp 21 containing vapour of the same isotope as that enclosed in the bulb of cell 11, i.e. in the present case $^{87}$Rb, ensures the orientation, by optical pumping, of the Rb atoms. The characteristics of said lamp, i.e. the various parameters acting on the light intensity of the pumping beam are selected, as already mentioned so as not to widen, beyond the desired limits, the energy levels of $^{87}$Rb, while assuring a convenient efficiency of the optical pumping.

On the path of the light beam between 21 and 11, is arranged a polarizing unit 22 (or 232) such that the beam striking cell 11 is circularly polarized.

The detection function of the apparatus, i.e. essentially the production of three optical signals, then of photoelectric signals, having values proportional, respectively, to those of the three components $M_x$, $M_y$, $M_z$ of the magnetic moment $\overline{M}$, takes place, in all three embodiments, at least partly, by observation on a light beam termed detection beam, crossing at right angles the pumping beam and issued by a so-called detection lamp 31, followed by a circular polarizer 32 (or 232).

The said optical signals—or those resulting from the observation of the absorption degree of the pumping beam itself along the $Oz$-axis—produced along each of the axes $Ox$, $Oy$, $Oz$, are received by photomultipliers (or photoelectric cells) $41_x$, $41_y$, $41_z$, respectively, the electrical output signals of which are treated by electronic circuits to produce the D.C. voltages adapted to pilot the control-circuits.

Said circuits which provide for control at zero value of the magnetic field at the level of cell 11, i.e. for compensation at this point of the external magnetic field, are built as follows.

Three so-called control circuits $45_x$, $45_y$ and $45_z$ to which said pilot voltages are applied supply direct currents—hereinafter termed control currents—$I_x$, $I_y$, $I_z$, respectively, to three pairs of coils $46_x$–$46'_x$, $46_y$–$46'_y$ and $46_z$–$46'_z$, arranged in Helmholtz positions along axes $Ox$, $Oy$ and $Oz$, respectively. The diameter of the coils, and consequently their mutual spacing in each pair, is selected in such a manner as to ensure the best possible homogeneity of the residual field at the level of cell 11, while taking account of the field intensity to be compensated, within the limits of the maximum dimensional requirements admissible according to the conditions of use of the apparatus.

For a field of the order of magnitude of the terrestrial magnetic field (0.5 gauss), coils having a diameter of 1.5 m., which results in a mutual spacing thereof of 0.75 m., ensure, throughout the volume of the cell a homogeneity such that it does not constitute a cause of widening of the Hanle curves. However, and as already mentioned, one may intentionally and for various reasons wish to cause the enlargement of the curves, thereby enabling one to substantially reduce the diameter and the spacing of the coils, and thus the overall size of the apparatus.

The control currents $I_x$, $I_y$, $I_z$ are measured or recorded with the maximum possible accuracy, their values immediately delivering signals proportional to the components $H_x$, $H_y$, $H_z$ of the external magnetic field. The calibration, as predetermined, of the three pairs of coils enables the measurement in absolute value of the three field components.

The details particular to each of the three embodiments of the apparatus of the invention will now be described.

In a first embodiment (FIGURE 4), cell 11 is submitted only to a single external, compensated magnetic field, and therefore to a static field, which has the advantage of enabling to exploit at a maximum the fineness of the lines.

The control takes place in two alternate phases. In a first phase, the pumping beam is aligned with $Oz$ and two detection beams both derived from detection lamp 31, are observed along $Ox$ and $Oy$. The signals collected on $Ox$ and on $Oy$ serve to control $I_y$ and $I_x$, respectively.

In a second phase, the pumping beam is aligned with $Ox$ and only one detection beam is exploited, aligned with $Oy$, to control $I_z$.

To carry this functional diagram into effect, three mirrors 23, 233 and 33 are arranged on $Oz$, $Ox$ and $Oy$, respectively, the two first mirrors being arranged on either side of pumping lamp 21 and the two last ones on either side of detection lamp 31. The first mirror 23 is retractable, the second mirror 233 is adapted to pivot between a first position 1 indicated in full lines and a second position 2 indicated by dotted lines, and the third mirror 33 is stationary. During the first above mentioned phase, mirror 23 is operative and mirror 233 is turned towards lamp 31 (position 1) the pumping beam 2 issuing from pumping lamp 21 thus being reflected by mirror 23 along $Oz$ towards polarizer 22, and the detection beam issuing from detection lamp 31 both by 233 along $Ox$ towards polarizer 232 and by 33 along $Oy$, towards polarizer 32. During the second phase, mirror 23 is retracted and therefore inoperative, and mirror 233 is turned towards lamp 21 (position 2), the pumping beam being reflected by mirror 233 along $Ox$ towards polarizer 232, and the detection beam only by mirror 33 along $Oy$ towards polarizer 32.

The detection device on $Ox$ comprises, mounted in series, a photomultiplier $41_x$ of known type, adapted to produce a signal the amplitude of which is propòrtional to the intensity of the detection light beam received, and therefore to the magnetic field at the level of cell 11, as previously shown, and an amplifier $142_x$ of known construction, adapted to amplify the signals of photomultiplier $41_x$ and produce a D.C. voltage proportional thereto, the outlets of amplifier $142_x$ being connected to switch $144_x$. The detection device on $Oy$ comprises, mounted in series, in a similar manner, a photomultiplier $41_y$, an amplifier $142_y$ and a switch $144_y$. Switch $144_x$ is adapted to occupy two positions, i.e. a first position 1 shown in full lines at FIGURE 4, in which it connects the outlet of amplifier $142_x$ with a control circuit $45_y$, and a second, idle position 2 shown in dotted lines at FIGURE 4. Likewise, switch $144_y$ is adapted to occupy a first position 1 shown in full lines at FIGURE 4, in which it establishes connection between the outlet of amplifier $142_y$ and a control circuit $45_x$, and a second position 2 shown in dotted lines at FIGURE 4, in which it connects the outlet of amplifier $142_y$ with a control circuit $45_z$.

Each control circuit $45_x$, $45_y$ and $45_z$ is conventionally designed to produce at the outlet thereof a direct current $I_x$, $I_y$, $I_z$, respectively, which when applied to the corresponding pair of coils $46_x$–$46_x{'}$, $46_y$–$46_y{'}$ and $46_z$–$46_z{'}$, respectively, causes said pair of coils to induce an antagonistic magnetic field counterbalancing the corresponding component $H_x$, $H_y$, $H_z$, respectively, of the external magnetic field H prevailing at the level of cell 11.

A common switching device of known type (not shown), is provided to cause the conditions for the first and second above described phases to be established, i.e. for the first phase, setting mirror 23 in active position, and mirror 233 and switches $144_x$ and $144_y$ in positions 1, and for the second phase, retracting mirror 23, and setting mirror 233 and switches $144_x$ and $144_y$ in positions 2. The operation of said common switching device is such that the duration of each of said phases is of the order of $\tau$ which is also of the order of magnitude of the time constant of the servo circuits, i.e. about half a second for instance in the case of $^{87}Rb$.

It may be seen that under the above described conditions, the optico-electrical control circuits are established, during each first phase of operation along the paths: lamp 31, mirror 233, polarizer 232, cell 11, photomultiplier $41_x$, amplifier $142_x$, control circuit $45_y$, coils $46_y$–$46_y{'}$ and lamp 31, mirror 33, polarizer 32, cell 11, photomultiplier $41_y$, amplifier $142_y$, control circuit $45_x$, coils $46_y$–$46_y{'}$, and during each second phase of operation along the path: lamp 31, mirror 33, polarizer 32, cell 11, photomultiplier 41, amplifier $142_y$, control circuit $45_z$, coils $46_z$–$46_z{'}$.

Due to the frequency of alternance of the first and second phases of operation the three components of the external magnetic field H at cell 11, and therefore said field H are permanently counterbalanced, a magnetic field zero being thus maintained.

Control circuits $45_x$, $45_y$ and $45_z$ incorporate indicator means enabling the reading of the value of the current applied to the corresponding pairs of coils $46_x$–$46_x{'}$, $46_y$–$46_y{'}$ and $46_z$–$46_z{'}$, from which the measure of the instant value of field H can be easily derived.

According to a second embodiment (see FIGURE 5) cell 11, which receives a pumping beam always in the direction of axis $Oz$ is subjected not only to the compensated external magnetic field, but also to an alternating, very weak field directed along axes $Ox$ or $Oy$.

The detection is carried out by observation of the absorption, along axis $Ox$, of a first detection beam which is the pumping beam itself, issued by lamp 21.

The control is effected, again, in two alternating phases of operation.

In a first phase, the above mentioned alternating magnetic field is aligned along $Ox$ and the detection beam, such as defined, are observed on $Ox$ and $Oz$. The collected signals on $Ox$ and $Oz$ serve for controlling $I_z$ and $I_x$, respectively.

In a second phase, the alternate magnetic field is aligned along $Oy$. Only the detection signal collected on $Oz$ from the pumping-detection beam, is exploited for controlling current $I_y$.

For carrying this basic diagram into effect, an A.C. generator 51 is used, the output of which is connected to a switch 52, adapted to occupy either a first position 1, shown in full lines at FIGURE 5, in which said output of generator 51 is connected to a pair of series-coupled, additional coils $53_x$–$53_x{'}$ arranged coaxially with axis $Ox$ on either side of cell 11 between coils $46_x$ and $46_x{'}$, or a second position 2 shown in dotted lines at FIGURE 5, in which generator 51 is connected to a similar pair of additional coils $53_y$–$53_y{'}$, similarly arranged coaxially with $Oy$. The intensity of $H_1$ and the frequency $\Omega$ of the alternating field produced at the level of cell 1 are selected as hereinabove mentioned.

The detection means on $Ox$ comprises, mounted in series, a photomultiplier $41_x$, a selective amplifier $242_x$, a phase detector $243_x$ to which is applied, on the other hand, the reference voltage produced by generator 51, and finally a switch $244_x$. The detection means on $Oz$ comprise, mounted in series, and in an identical fashion, the same components as that on $Ox$, i.e. a photomultiplier $41_z$, a selective amplifier $242_z$, a phase detector $243_z$ and a switch $244_z$. No detection means are provided on $Oy$.

Switch $244_x$ is adapted to occupy either a first position 1 shown in full lines, in which the output of phase-detector $243_x$ is connected to control-circuit $45_z$, or a second, idle position 2 shown in dotted lines. Similarly, switch $244_z$ is adapted to connect the output of phase detector $243_z$ either, in a first position 1 shown in full lines with control-circuit $45_x$ or, in a second position 2 shown in dotted lines, with control-circuit $45_y$.

A switching device of known type (not shown) having the same frequency as that hereinabove mentioned in connection with the device of FIGURE 4, is provided for causing switches 52, $244_x$ and $244_z$ to occupy alternately and all together their positions 1 or 2, thus alternately establishing the optico-electrical control paths and the energizing circuits of coils $53_x$–$53_x{'}$, and $53_y$–$53_y{'}$ corresponding to the first and second operating phases, respectively, as follows.

First phase: control paths from detection lamp 31, through polarizer 32, cell 11, detection means $41_x$, $242_x$, $243_x$, control-circuit $45_z$, to coils $46_z$–$46_z{'}$ and from pumping lamp 21, through polarizer 22, cell 11, detection means $41_z$, $242_z$, $243_z$, control-circuit $45_x$ to coils $46_x$–$46_x{'}$; energizing circuit from generator 51 to coils $53_x$–$53_x{'}$.

Second phase: control path from pumping lamp 21, through polarizer 22, cell 11, detection means $41_z$, $242_z$, $243_z$, control-circuit $45_y$, to coils $46_y$–$46_y{'}$; energizing circuit from generator 51 to coils $53_y$–$53_y{'}$.

Selective amplifiers $242_x$, $242_y$ and $242_z$ being adapted to produce a selective amplification at frequency $\Omega$ of generator 51, and phase detectors $243_x$, $243_y$ and $243_z$ carrying out a detection in accordance with the phase of the signals received with respect to the frequency of generator 51, the signals at the output of said phase detectors are proportional to the components $H_x$, $H_y$ and $H_z$ of the external field H prevailing at the level of cell 11, as hereinabove explained, and said field H is counterbalanced by the field created by coils $46_x$–$46_x{'}$, $46_y$–$46_y{'}$ and $46_z$–$46_z{'}$ as in the device of FIGURE 4.

The third embodiment shown at FIGURE 6 is generally similar to the above described second embodiment, the cell 1 still being subjected to an alternating field of low intensity with the difference however that said field is directed permanently along axis $Oy$, i.e. along the beam issuing from lamp 31.

The detection is operated on axis $Oz$ as in the second embodiment, and on axis $Ox$ by separating the signal collected at the output of photomultiplier $41_x$ on said axis $Ox$ into a direct component which serves to control the current $I_y$ generated by control-circuit $45_y$ and an alternating component (at frequency $\Omega$) for controlling the current $I_z$ generated by control-circuit $45_z$.

This embodiment has the advantage, relative to the others, of operating continuously without the previously described alternating operational phases, and consequently of requiring no switches such as 52, $244_x$ and $244_z$ of FIGURE 5, nor switching device for controlling such switches.

This embodiment of FIGURE 6 includes an AC generator 51 as in FIGURE 5, but the output of said generator is permanently connected to a single pair of additional coils $53_x$–$53_x'$ arranged coaxially on axis $Ox$, and is otherwise applied to phase detectors $243_x$ and $243_z$ comprised in the detection means arranged on axes $Ox$ and $Oz$, respectively, said detection means being of the same composition as in the case of FIGURE 5, and no detection means being provided on axis $Oy$. At the output of photomultiplier $41_x$ and before selective amplifier $242_x$ on axis $Ox$ is connected a D.C. amplifier $142_x$ which produces a direct signal for controlling control-circuit $45_y$, adapted for being controlled by such a signal.

The operation of the detection means and of the control-circuits and counterbalancing coil pairs is finally the same as previously described in connection with FIGURE 5.

As already mentioned hereinabove, instead of using the observation of the absorption of light intensity of a so-called detection beam (which may in certain cases be the pumping beam) as described in the three above examples, the detection can be based on the observation of the magnetic rotation (Faraday effect) of polarized light, or of the polarization of fluorescence light. In such cases the detections on the three axes, $Ox$, $Oy$ and $Oz$ present in practice certain sensitivity differences. The apparatus may then be oriented in an approximate manner relative to the external magnetic field so as to compensate said sensitivity differences by the difference in magnitude of the variations of magnetic rotation or of fluorescence polarization which are observed on each of the three axes.

Instead of using $^{87}$Rb vapour in cell 11 in above described, or $^{111}$Cd as suggested in the above theoretical explanations, use may be made in the neutral method and apparatus of the invention of any other neutral isotopic atoms having similar properties, such as, for instance, $^{113}$Cd, $^{199}$Hg, $^{133}$Cs, $^{85}$Rb, $^{39}$K, $^{23}$Na, He at metastable level $^3S_1$.

What we claim is:

1. The method for controlling a magnetic field within a space comprising:
   positioning three pairs of field-compensating coils adjacent the space, each pair in Helmholtz position along first, second and third mutually perpendicular axes intersecting in the space,
   providing electrical currents in the field compensating coils,
   producing an optical pumping beam along the first axis in the space, thereby orienting particles in the space along the pumping beam,
   providing detection light beams along the second and third axes, and observing absorption of the detection light beams by the particles in the optical pumping beam, thereby detecting precession of the oriented particles,
   controlling the currents in the field-compensating coils along the second and third axes in response to the detecting of precessions along the third and second axes respectively, reducing precessions, obtaining maximum orientation of particles in the pumping beam, and thereby obtaining minimum magnetic field within the space,
   discontinuing the respective pumping and controlling steps,
   promulgating a pumping beam along the second axis, detecting precession by observing absorption of the detection beam along the third axis, and
   controlling the current in the field-compensating coils along the first axis in response to the detecting along the third axis.

2. The method for controlling a magnetic field within a space comprising:
   positioning three pairs of field-compensating coils adjacent the space, each pair in Helmholtz position along first, second and third mutually perpendicular axes intersecting in the space,
   providing electrical currents in the field compensating coils,
   producing an optical pumping beam along the first axis in the space, thereby orienting particles in the space along the pumping beam,
   providing an alternating magnetic field along the second axis,
   providing a detection beam along the second axis,
   observing absorption of the detection beam by particles in the pumping beam,
   controlling the currents in the field-compensating coils along the second axis in response to detecting absorption of the pumping beam along the first axis,
   controlling the currents in the field-compensating coils along the first axis in response to the observing of absorption of the detection light beam along the second axis,
   discontinuing the respective pumping and controlling steps and the providing of an alternating magnetic field along the second axis,
   providing an alternating magnetic field along the third axis, and
   controlling the current in the field-compensating coils along the third axis in response to detecting of absorption of the pumping beam along the first axis.

3. The method for controlling a magnetic field within a space comprising:
   positioning three pairs of field-compensating coils adjacent the space, each pair in Helmholtz position along first, second and third mutually perpendicular axes intersecting in the space,
   providing electrical currents in the field compensating coils,
   providing an optical pumping beam along a first axis in the space, thereby orienting particles in the space along the pumping beam,
   providing an alternating magnetic field along the second axis,
   providing a detection light beam along the second axis,
   detecting phase displacement of absorption of the optical pumping beam with respect to the alternating field, and in response thereto controlling the current in the field-compensating coils along the second axis,
   detecting phase displacement of absorption of the detection light beam with respect to the alternating field, and in response thereto controlling the current in the field-compensating coils along the first axis,
   observing absorption of the detecting beam along the second axis, and in response thereto controlling the current in the field-compensating coils along the third axis.

4. Apparatus for controlling a magnetic field in a cell comprising:
   an optical resonance cell at a center of a trirectangular trihedron having first, second and third mutually perpendicular axes,
   first, second and third pairs of field-compensating coils positioned respectively on the first, second and third axes, coils in each pair having axes aligned on the respective trihedron axis of that pair and being positioned on opposite sides of the cell,
   optical pumping beam producing means adjacent the cell for producing an optical pumping beam,
   first directing means adjacent the optical pumping means having first and second positions for respectively directing the optical pumping beam into the cell along the first axis and along the second for orienting particles in the cell, detection beam producing means adjacent the cell for producing detection beams, second directing means adjacent the detection beam means for directing detection beams produced by the detection beam producing means into the cell, the second directing means having a first position wherein the detection beam is directed along second and third axes and a second position wherein the detection beam is directed along only the third axis, first and second photoelectric detector means respectively positioned on the second and third axes for receiving beams passing through the cell on the respective axes, first and second switches, a first control circuit connected to the first photoelectric detector, and to the first switch, the first switch having first and second positions, the first position being connected to the third pair of field compensating coils for controlling the current in the third coils in response to output of the second photoelectric detector, a second control circuit connected to the second photoelectric detector and to the second switch, the second switch having first and second positions, connected to the second and first pairs of compensating coils respectively for controlling current supplied to the coils in response to output of the second photoelectric detector.

5. Apparatus for controlling a magnetic field in a cell comprising:

an optical resonance cell at a center of a trirectangular trihedron having first, second and third mutually perpendicular axes, first, second and third pairs of field-compensating coils positioned respectively on the first, second and third axes, coils in each pair having axes aligned on the respective trihedron axis of that pair and being positioned on opposite sides of the cell, optical pumping means adjacent the cell for producing an optical pumping beam and for directing said pumping beam into the cell along a first axis for orienting particles in the cell, detection beam producing means adjacent the cell for producing a detection beam and for directing the detection beam into the cell along the second axis, an alternating current source, first and second optical detectors respectively positioned on the first and second axes, and responsive to intensities of the beams on the respective axes, a first phase detector connected to said first optical detector and to said alternating current source, a second phase detector connected to said second optical detector and to said alternating current source, first and second switches respectively connected to the outputs of said first and second detectors, each switch having a first position and a second position, first and second pairs of auxiliary coils positioned respectively on the second and third axes, a third switch connected to the alternating current source, in a first position connected to the first pair of auxiliary coils, and in a second position connected to the second pair of auxiliary coils, a first control circuit connected to the second pair of field-compensating coils and connected through the first switch in the first position to the first phase detector for controlling the current in the second field-compensating coils in response to the output of the first phase detector when the first switch is in the first position, a second control circuit connected to the third pair of field-compensating coils and connected through the first switch in the second position to the first phase detector for controlling the current in the third coils in response to the output of the first phase detector when the first switch is in the second position, a third control circuit connected to said second switch and to the first pair of field-compensating coils, said third control circuit being responsive to the output of said second phase detector for controlling the current in the first pair of field-compensating coils when the second switch is in the first position.

6. Apparatus for controlling a magnetic field in a cell comprising:

an optical resonance cell at a center of a trirectangular trihedron having first, second and third mutually perpendicular axes, first, second and third pairs of field-compensating coils positioned respectively on the first, second and third axes, coils in each pair having axes aligned on the respective trihedron axis of that pair and being positioned on opposite sides of the cell, optical pumping means adjacent the cell for producing an optical pumping beam and directing the optical pumping beam into the cell along a first axis for orienting particles in the cell, detection beam producing means adjacent the cell for producing a detection light beam and directing the detection beam into the cell along the second axis, first and second photoelectric detectors respectively positioned on the first and second axes responsive to beams passing through the cell on the respective axes, an alternating current source, coils connected to said alternating current source and positioned on the second axis for producing an alternating magnetic field therealong, first and second phase detectors connected to the alternating current source and respectively connected to the first and second photoelectric detectors, a first control circuit connected to the first phase detector and to the second pair of field-compensating coils for controlling the current therein in response to the output of the first phase detector, a second control circuit connected to the second phase detector and to the first pair of field-compensating coils for controlling the current therein in response to the output of the second phase detector, a third control circuit connected to the second photoelectric detector, and to the third field-compensating coils for controlling the current therein in response to output of the second photoelectric detector.

References Cited

UNITED STATES PATENTS

| | | | |
|---|---|---|---|
| 3,443,208 | 5/1969 | Webb | 324—.5 |
| 3,150,313 | 9/1964 | Dehmelt | 324—.5 |
| 3,191,118 | 6/1965 | Jung | 324—.5 |
| 3,197,694 | 7/1965 | Cunningham | 324—.5 |
| 3,284,699 | 11/1966 | Malnar | 324—.5 |

RUDOLPH V. ROLINEC, Primary Examiner

MICHAEL J. LYNCH, Assistant Examiner